3,035,030
THIOKETENES AND POLYMERS
Edward G. Howard, Jr., Hockessin, Del., assignor to
E. I. du Pont de Nemours and Company, Wilmington,
Del., a corporation of Delaware
No Drawing. Filed June 10, 1960, Ser. No. 35,109
10 Claims. (Cl. 260—79.7)

This invention relates to, and has as its principal objects provision of, novel thioketenes, polymers of the same, and methods of synthesis therefor.

Ketene is a chemical of unusual interest because of its highly unsaturated and reactive nature and much is known about its chemistry. The sulfur analogs of the ketenes, however, have received little attention. This invention is concerned with a new class of such compounds, providing monomeric thioketenes having the formula RCH=C=S, where R is hydrogen or monovalent hydrocarbyl, and polymers of such ketenes, including modified polymers.

According to this invention, monomeric thioketenes of the aforementioned type are produced by pyrolyzing ethynyl sulfides of the general formula

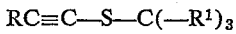

$$RC\equiv C-S-C(-R^1)_3$$

in which R has the previously indicated meaning, and the $R^1$'s, which may be different, are alkyl, preferably lower alkyl.

In one convenient method for preparing thioketene, a reactor is packed with quartz and connected to receptacles cooled in liquid nitrogen and to means for reducing the pressure within the reactor to below atmospheric. The reactor is heated to at least 400° C., the pressure is reduced to below atmospheric and the ethynylthioether of formula $RC\equiv C-S-C(R^1)_3$, e.g., tert.-butyl ethynylthioether, is passed through the heated quartz. The desired thioketene is collected in the liquid nitrogen trap as a pale orange-colored solid.

The temperature at which the pyrolysis is effected is above 400° C. but below 600° C. Above the latter temperature decomposition of the desired product becomes substantial.

In the preferred practice the pressure within the reactor is reduced to below atmospheric, i.e., to between 0.5 and 0.001 atmosphere to aid in removing the reactants from the cracking zone and thereby minimize secondary reactions which operate to decrease the yield of desired product and increase the throughput capacity of the reactor. In general, pressures from 0.2 to 0.005 atmosphere have been found most desirable because they are attainable with readily available vacuum pumps.

In place of the quartz used in the detailed examples which follow, there can be used any other material which is inert to the reactants and reaction products and which is capable of acting as a diffuser. Examples are glass beads, silica pellets, and the like. The reactor can be quartz, steel, or any other material which withstands temperatures up to 600° C. and which is inert to the reactants and reaction products.

Monothioketene, the preferred monomeric product of the invention, is a pale orange solid, stable at temperatures below —80° C. and characterized by having an infrared spectrum with an absorption band at 5.7 microns. Monothioketene, when warmed to —80° C., readily polymerizes to an intractable white solid insoluble in solvents for the monomer, e.g., cyclohexene, toluene, dimethylformamide, 1:1 by volume mixture of chloroform and carbon tetrachloride, and n-heptane, and stable at temperatures below 150° C.

The examples which follow are submitted to illustrate but not to limit this invention.

*Example I*

A reactor consisting of a vertical tube 1" in diameter and 18" long is packed with quartz and heated for 12" of its length. The reactor is connected to a trap cooled in liquid nitrogen and to means for reducing the pressure within the reactor to below atmospheric. The reactor is heated to 500° C., evacuated to 0.1 mm. pressure, and 11 g. of tert.-butyl ethynylthioether are distilled into the reactor over a period of 15 minutes. A pale orange solid is collected in the trap. The product, thioketene, polymerized upon warming to —80° C. The polymer thus obtained is a white solid, which becomes light brown upon exposure to air at room temperature. The polymer is insoluble in dimethylformamide, chloroform, tetrahydrofuran, and tetramethylene cyclic sulfone. Heat-treatment at 150° C. brings about decomposition of the polymer. The polymer analyzes:

*Analysis.*—Calcd. for $(C_2H_2S)_n$: C, 41.23%; H, 3.47%; S, 55.24%. Found: C, 41.24%; H, 3.75%; S, 57.4%.

The infrared spectrum has bands at $5.9\mu$, $6.35\mu$, and $6.6\mu$ indicative of the presence of double bonds in the product.

A 0.4 g. sample of thioketene polymer obtained as above was heated with 2 g. of phenylmercaptan at 100° C. The oily product was filtered and the filtrate was washed with petroleum ether. The resultant sticky grease was dried at 60° C./0.3 mm. It analyzed 44.94% S. This analysis corresponds to a product composed of approximately 60% of polythioketone and 40% combined phenylmercaptan groups. Analysis by infrared shows absorption indicating the presence of aryl groups.

Monomeric thioketene is stable in solution in a medium, such as cyclohexene, at —80° C. This is illustrated below.

*Example II*

The procedure of Example I was repeated, except that the effluent gases from 11 g. of tert.-butyl ethynylthioether were led to a receptacle containing 50 ml. of vigorously stirring cyclohexene cooled in an acetone-solid carbon dioxide bath. The pink-colored solution obtained showed little or no polymer after six hours' standing at —80° C.

The tert.-butyl ethynylthioether used in the above experiments was prepared as follows:

To a solution of 348 g. (3 moles) of tert.-butyl vinyl thioether in 600 ml. of dry carbon tetrachloride at —20° C. was added with vigorous stirring a solution of 540 g. (3 moles) of bromine in 750 ml. of dry carbon tetrachloride. The mixture was pale red in color, so an additional 10 g. of tert.-butyl vinyl thioether was added to bring the color to a pale yellow. N,N-diethylaniline, 490 g. (3.3 moles), was added and the mixture was heated slowly. An exothermic reaction started at 70° C. and the contents of the reactor were cooled to keep the temperature between 75° and 78° C. The reaction mixture became progressively thicker. After reaction was complete, the reaction mixture was held at 75° C. for 30 minutes and thereafter poured into 3 l. of ice and water. The organic layer was removed and washed with 10% aqueous hydrochloric acid to remove excess N,N-diethylaniline. The organic layer was dried over anhydrous magnesium sulfate and distilled, B.P. 52° C./1.8 mm. The distillate, 2-bromovinyl tert.-butyl thioether, amounted to 450 g., which corresponds to a 77% yield.

A 1 l. four-necked flask was fitted with a paddle stirrer, connections to permit operation under reduced pressure, dropping funnel, thermometer, and distillation head connected to a collecting vessel and then to a trap cooled in an acetone-solid carbon dioxide bath. The flask was charged with 132 g. (2 moles) of 85% potassium hydroxide, micropulverized through a 1/16 inch mesh sieve, and 400 ml. of mineral oil. Over a one-hour period there was added 223 g. (1.15 moles) of the 2-bromovinyl tert.-butyl thioether prepared as above, while the pressure within the reactor was maintained at 35 mm. and the temperature at 120 to 130° C. After completion of the addition of the 2-bromovinyl tert.-butyl thioether, the mixture was heated to 140° C. The products which collected in the receiving flask and in the trap were combined, water was removed, and the product dried over anhydrous magnesium sulfate. Distillation of the product yielded 95 g. of material boiling at 40° to 44° C. at 44 mm. pressure.

*Example III*

The reactor of Example I was attached to a 500 ml. round-bottom flask, which was cooled by a solid carbon dioxide-acetone bath. This flask was charged with 100 ml. of dry, peroxide-free cyclohexene, and attached to a trap cooled by liquid nitrogen after the system was evacuated. Over a period of 2 hours, 16 g. of propynylethylthioether [$CH_3 \equiv CSCH_2CH_3$], prepared as described by H. J. Boonstra, L. Brandsma, A. M. Wiegman, J. F. Arens, Rec. trav. chim. 78, 252 (1959)] was distilled under a pressure of about 10 mm. into the reactor, which had been previously heated to 460±5° C. The monomeric methylthioketene, $CH_3CH=C=S$, polymerized in the cyclohexene (4 g. of polymer). In addition, 1 g. of polymer formed in the cooler portions of the reactor and 0.5 g. on warming the trap cooled by liquid nitrogen.

The polymer is a tractable, stable, cream-colored solid even at room temperature. The polymer melts without apparent decomposition at 131° to 135° C. (softening a little at 100° C.). Fibers can be drawn from the liquid. The polymer is soluble in hot solvents such as xylene, tetrachloroethylene, and chlorobenzene.

A sample was recrystallized from hot xylene and dried at 55° C. under 1 mm. pressure for 6 hours and analyzed as follows:

Calcd. for $(C_3H_4S)_n$: C, 49.95%; H, 5.59%. Found: C, 50.82%; H, 5.52%.

*Example IV*

Example II was repeated, except that the thioketene which formed was collected at −80° C. in 100 ml. of peroxide-free cyclohexene containing 5 ml. of aniline. After warming slowly to room temperature and removal of the cyclohexene, there remained a paste which was triturated with petroleum ether and filtered. The crude solid weighed 3 g. A sample was recrystallized from cyclohexane twice, the last time it was given a decolorizing carbon treatment. The properties of the product correspond to those of the known thioacetanilid in melting point and solubility characteristics. The thioacetanilid formed had a melting point of 76–77° C. (literature value, 74.5–76° C.), was soluble in aqueous sodium hydroxide, and was precipitated by carbon dioxide. These are the properties reported in the literature for the known thioacetanilid.

*Example V*

Following the procedure of Example I, 19 g. of tert.-butyl 2-phenylethynyl thioether was added dropwise into the reactor heated at 500° C. After completion of the addition, the mixture of solid and starting material was removed from the reactor by washing with pentane. The product was isolated by filtration and amounted to 3 g. The polymer thus obtained was purified by trituration with boiling xylene and drying at 58° C./0.5 mm. The purified product analyzed:

Calcd. for $(C_8H_6S)_n$: C, 71.59%; H, 4.50%; S, 23.89%. Found: C, 71.89%; H, 4.75%; S, 23.78%.

The tert.-butyl 2-phenylethynyl thioether used in the above experiment was prepared by the following procedure:

To 54.5 g. (0.5 mole) of phenylacetylene there was added 45 g. (0.5 mole) of tert.-butyl mercaptan at ambient temperature. The mixture was allowed to stand overnight at ambient temperature and thereafter distilled. The distillate which boiled at 89 to 91° C. at 0.3 mm. pressure was collected and amounted to 63 g. The $n_D^{25}$ was 1.5840 and analyzed:

Calcd. for $C_{12}H_{16}S$: C, 16.67%. Found: C, 16.86%.

To 57.6 g. (0.3 mole) of the tert.-butyl 2-phenylvinyl thioether, prepared as above, was added 48 g. (0.3 mole) of bromine in 300 ml. of carbon tetrachloride at −23° C. This was followed by 45 g. (0.3) mole of N,N-diethylaniline. The reaction mixture was gradually warmed and at 77° C. an exothermic reaction occurred. After ½ hour at 70° C. the semisolid product which formed was shaken with water and then with 5% aqueous hydrochloric acid. The product was then added to 100 g. of potassium hydroxide, the pressure reduced to 0.3 mm. and the mixture heated to 170° C. The oil which distilled was collected and upon redistillation produced a 29 g. fraction boiling at 85° to 87° C. at 0.4 mm.; $n_D^{25}$, 1.5817 which proved to be tert.-butyl 2-phenylethynyl thioether.

*Analysis.*—Calcd. for $C_{12}H_4S$: S, 16.85%. Found: S, 16.68%.

In place of the tert.-butyl ethynyl thioether and the tert.-butyl 2-phenylethynyl thioether of the detailed examples, there can be used any ethynyl thioether corresponding to $RC \equiv C—S—C(R^1)_3$, which R is hydrogen or monovalent hydrocarbyl, e.g., alkyl of up to 18 carbon atoms, aryl of up to 10 carbons, aralkyl of up to 7 carbon atoms, and cycloalkyl of up to 8 carbon atoms; and $R^1$ is alkyl, preferably lower alkyl, i.e., of up to 7 carbon atoms. Examples of alkyl radicals of up to 18 carbons are methyl, ethyl, propyl, butyl, heptyl, decyl, dodecyl, and heptadecyl; examples of aryl radicals of up to 10 carbons are phenyl, tolyl, xylyl, and naphthyl; an example of an aralkyl radical of up to 7 carbons is benzyl; examples of cycloalkyl radicals of up to 8 carbons are cyclohexyl, methyl cyclohexyl, ethylcyclohexyl and dimethyl cyclohexyl; and examples of alkyl radicals of up to 7 carbon atoms are methyl, ethyl, butyl and heptyl. Specific ethynyl thioethers usefully employed in the process of this invention are tert.-butyl ethynyl thioether, tert.-butyl 2-phenylethynyl thioether, tert.-butyl 2-octadecylethynyl thioether, tert.-butyl 2-hexylethynyl thioether, tert.-butyl 2-dodecyl ethynyl thioether, tert.-butyl-2-tolylethynyl thioether, tert.-butyl 2-naphthylethynyl thioether, tert.-butyl 2-cyclohexylethynyl thioether, tert.-butyl 2-benzylethynyl thioether, butynylethyl thioether, heptynylethylthioether, and the like.

Substitution of the above ethynyl thioethers for the tert.-butylethynyl thioether of Example I in the process of Example I will produce 2-hexyl thioketene, octadecyl thioketene, dodecyl thioketene, naphthyl thioketene, tolyl thioketene, cyclohexyl thioketene, and benzyl thioketene.

Monomeric thioketenes are useful as intermediates for the preparation of thioesters, thioamides, and the like. Thioketenes readily polymerize and the polymers are useful as protective coatings and the like.

As illustrated in Example I, treatment of polymeric thioketenes with phenyl mercaptan transformed them to stable greases. It is to be understood that this stabilizing effect is generic to aryl mercaptans and that in place of phenyl mercaptan there can be used tolyl mercaptan, xylyl mercaptan, o-ethylphenyl mercaptan, naphthyl mercaptan, and the like. The products obtained are stable greases useful as lubricants for moving parts of machinery, as bearing greases, coatings to inhibit corrosion of metal parts, and the like.

Since obvious modifications and equivalents in the invention will be evident to those skilled in the chemical arts, I propose to be bound solely by the appended claims.

The embodiments of the invention in which an exclusive property or privilege is claimed are defined as follows:

1. Compounds of the formula $RHC=C=S$ wherein R is selected from the group consisting of hydrogen, alkyl of up to 18 carbons, aryl of up to 10 carbons, aralkyl of up to 7 carbons, and cycloalkyl of up to 8 carbons.
2. Thioketene.
3. Methylthioketene.
4. A solid homopolymer of a compound of claim 1.
5. A solid homopolymer of thioketene.
6. A solid homopolymer of methylthioketene.
7. A solution of thioketene in an organic medium.
8. The process of preparing a thioketene which comprises pyrolizing, at a temperature of about 400–600° C. and a pressure below about 0.5 atmosphere, a sulfide of the formula $R \equiv C-S-C(R^1)_3$, wherein R is a defined in claim 1 and $R^1$ is alkyl.
9. The process which comprises pyrolizing, at a temperature of about 400–600° C. and a pressure below about 0.5 atmosphere, tert.-butyl ethynylthioether.
10. The process which comprises pyrolizing, at a temperature of about 400–600° C. and a pressure below about 0.5 atmosphere, propynylethylthioether.

References Cited in the file of this patent

UNITED STATES PATENTS

| | | |
|---|---|---|
| 2,218,066 | Boese | Oct. 15, 1940 |
| 2,284,896 | Hanford et al. | June 2, 1942 |
| 2,430,479 | Pratt et al. | Nov. 11, 1947 |

FOREIGN PATENTS

| | | |
|---|---|---|
| 668,309 | Great Britain | Mar. 12, 1952 |

UNITED STATES PATENT OFFICE
CERTIFICATE OF CORRECTION

Patent No. 3,035,030            May 15, 1962

Edward G. Howard, Jr.

It is hereby certified that error appears in the above numbered patent requiring correction and that the said Letters Patent should read as corrected below.

Column 5, line 16, for "$R{\equiv}C-S-C(R^1)_3$," read -- $RC{\equiv}C-S-C(R^1)_3$, --.

Signed and sealed this 2nd day of October 1962.

(SEAL)
Attest:

ERNEST W. SWIDER
Attesting Officer

DAVID L. LADD
Commissioner of Patents